US011827072B2

(12) United States Patent
Holcombe (10) Patent No.: US 11,827,072 B2
(45) Date of Patent: Nov. 28, 2023

(54) RETRACTABLY EXTENDABLE TRAILING AXLE

(71) Applicant: Holcombe CVI, LLC, Ault, CO (US)

(72) Inventor: Brent Anthony Holcombe, Ault, CO (US)

(73) Assignee: Holcombe CVI, LLC, Ault, CO (US)

( * ) Notice: Subject to any disclaimer, the term of this patent is extended or adjusted under 35 U.S.C. 154(b) by 0 days.

(21) Appl. No.: 17/877,368

(22) Filed: Jul. 29, 2022

(65) Prior Publication Data

US 2023/0109453 A1    Apr. 6, 2023

Related U.S. Application Data

(60) Provisional application No. 63/251,983, filed on Oct. 4, 2021.

(51) Int. Cl.
*B60G 9/00* (2006.01)

(52) U.S. Cl.
CPC .......... *B60G 9/003* (2013.01); *B60G 2200/31* (2013.01); *B60G 2206/10* (2013.01)

(58) Field of Classification Search
CPC ............... B60G 9/003; B60G 2200/31; B60G 2206/10; B60G 9/02
See application file for complete search history.

(56) References Cited

U.S. PATENT DOCUMENTS

| 5,823,629 | A | 10/1998 | Smith et al. | |
|---|---|---|---|---|
| 6,082,748 | A * | 7/2000 | Hartmann | B60G 3/04 280/124.179 |
| 6,247,712 | B1 | 6/2001 | Smith et al. | |
| 9,809,074 | B2 * | 11/2017 | Strong | B60G 11/28 |
| 2004/0056441 | A1 | 3/2004 | Chalin | |
| 2014/0210174 | A1 | 7/2014 | Conaway et al. | |
| 2014/0232080 | A1 | 8/2014 | Karel et al. | |
| 2020/0156427 | A1 | 5/2020 | Schutt | |

FOREIGN PATENT DOCUMENTS

| CA | 2605046 | | 10/2006 |
|---|---|---|---|
| EP | 3216631 | A1 * | 9/2017 |
| WO | WO 2006/113670 | | 10/2006 |
| WO | WO 2011/146163 | | 11/2011 |

OTHER PUBLICATIONS

U.S. Appl. No. 63/251,983, filed Oct. 4, 2021.

* cited by examiner

*Primary Examiner* — Faye M Fleming
(74) *Attorney, Agent, or Firm* — James B. Conte; Craig R. Miles; CR MILES P.C.

(57) ABSTRACT

A vehicle suspension assembly includes a trailing axle carried by a frame of the assembly. The frame can retract to a retracted state from an extended state and extend from the retracted state to the extended state. The retraction and extension can occur along a longitudinal axis of the frame. An operator can pivotally raise and lower a free end of frame in the retracted or extended state along an arcuate path when the vehicle suspension assembly connects to a vehicle.

20 Claims, 7 Drawing Sheets

RETRACTABLY EXTENDABLE TRAILING AXLE

This United States Non-Provisional Patent Application claims the benefit of U.S. Provisional Patent Application No. 63/251,983, filed Oct. 4, 2021, hereby incorporated by reference herein.

I. FIELD OF THE INVENTION

The disclosure concerns a vehicle suspension assembly. The assembly can include a trailing axle carried by a trailing arm of the assembly. The trailing arm can retract to a retracted state from an extended state and extend from the retracted state to the extended state. The retraction and extension can occur along a longitudinal axis of the trailing arm. An operator can pivotally raise and lower a free end of the trailing arm in the retracted or extended state along an arcuate path when the vehicle suspension assembly connects to a vehicle.

II. BACKGROUND

US Publication, US 2020/0156427, Published May 21, 2020, Randy Schutt, concerns a vehicle suspension assembly which includes an axle member, a pair of mounting brackets configured to couple to a vehicle frame, and a trailing arm arrangement that includes a first trailing arm portion having a first end pivotably coupled to one of the pair of mounting brackets, and a second end rotationally coupled with the axle member at a first position, a second trailing arm portion having a second end pivotably coupled to the other of the pair of mounting brackets, and a second end rotationally coupled with the axle member at a second position, and a first torsional member having a first end fixedly coupled to the first trailing arm portion and a second end fixedly secured to the axle member at a third position, the first torsional member configured to transmit torsion of the axle member to the first trailing arm portion.

US Patent Publication US 2014/0232080, Published Aug. 21, 2014, John Karel, concerns an axle lift assembly which includes a beam slidably coupled with and extending on a longitudinal extent of a vehicle frame. A trailing arm has a first end pivotably coupled with the beam. An axle is rotatably coupled with an intermediate portion of the trailing arm. An air spring is disposed between a second end of the trailing arm and the beam for absorbing an upward force from the axle. A support bracket extends down from the beam proximate the first end of the trailing arm. A pneumatic actuator is disposed between the support bracket and the trailing arm for raising the axle from a deployed position to a retracted position that substantially eliminates the upward force on the air spring from the axle.

US Patent Publication US 2014/0210174, Published Jul. 31, 2014, Richard Conway, concerns a vehicle suspension assembly which includes first and second mounting brackets each adapted to couple to a vehicle frame assembly, first and second trailing arms each having a first end pivotably coupled to the mounting brackets, and a second end located outboard of the first end of the associated trailing arm; an axle member having a first end and a second end; an integrated first mounting arrangement and an integrated second mounting arrangement coupled to the associated ends of the axle member, wherein the mounting arrangements pivotally couple the second end of the associated trailing arm to one of the ends of the axle member, and wherein the mounting arrangements couple one of the ends of the axle member to the spindle assembly.

International Publication WO 2011/146163, May 21, 2010, Jason Heath, concerns a suspension assembly which comprises an axle member extending between a pair of trailing beam assemblies, wherein each trailing beam assembly comprises first, and second members pivotally coupled to one another that cooperate to form an aperture within which the axle member is clamped. Each trailing beam assembly comprises a first member having a first recess, and a second member that includes a second recess, wherein the first and second members are pivotally coupled to one another and are pivotable between a first position, wherein the first recess and second recess cooperate with one another to form an open aperture, and a second position, wherein the first recess and the second recess cooperate to form a first closed aperture that receives the axle member therethrough.

International Publication WO 2006/113670, Published Oct. 26, 2006, William Hicks, discloses a vehicle suspension system including a pair of trailing arms. Each of the trailing arms has a body portion with a pivot at a forward portion thereof for pivotably mounting the trailing arms to a vehicle frame. Each trailing arm further includes a rear portion integrally formed with the body portion. Each rear portion has an integral, inwardly extending axle-attachment portion, and an integral, outwardly-extending spindle portion. The vehicle suspension system further includes an elongated center axle member having opposite ends rigidly connected to the axle-attachment portions of the trailing arms and interconnecting the trailing arms.

U.S. Pat. No. 5,823,629, filed Dec. 29, 1994, Fred Smith, concerns an articulating trailing tag axle having first hydraulic drives (e.g. cylinders, pistons) and lift arms attached to dump truck side panels, preferably reinforced, a trailing tag axle, and wheels supported by the tag axle, between operative and storage positions without bending the truck frame. A linkage assembly and second hydraulic drives (e.g. cylinders, pistons) coupled to the lift arms and the first hydraulic drives move the tag axle and the wheels between raised and lowered positions. In the operative positions of the lift arms and the tag axle, the wheels contact the ground and, because of the first hydraulic drive construction, move smoothly over road bumps and into road dips. In their storage position, the lift arms are disposed above and to the rear of the dump truck with the trailing tag axle and the wheels above the body but lowered to minimize their height above the truck. With the lift arms and the tag axle in the storage position, the second hydraulic drives initially move the tag axle, and then the first hydraulic drives move the lift arms, to move the tag axle to the operative position. With the lift arms and the trailing tag axle in the operative position, the lift arms, and the tag axle, are moved to position the tag axle at the storage position. With the lift arms and the tag axle in the storage position, the truck load can be dumped without obstruction. Furthermore, the force for moving the tag axle is minimal when the lift arms are in the storage position.

III. SUMMARY OF THE INVENTION

An embodiment of the invention is exemplified with reference to an exemplary vehicle suspension assembly. The exemplary assembly can have a frame having a first frame section slidably engaged to a second frame section. A trailing axle carrier assembly connects to the first frame section. A trailing axle couples to the frame by way of the trailing axle carrier assembly. A pivot connects to the second frame section. A drive couples to the first frame section and the second frame section. A lift couples to the frame. The drive actuates to orient the frame into an extended configuration from a retracted configuration and orient the frame from the contracted configuration to the extended configuration. The frame in the extended configuration has an increased length along a longitudinal axis of the frame as compared to when the frame resides in the retracted configuration.

When the frame connects to a vehicle, the lift can actuate to orient the frame from an operative position to a storage position. In the operative position the frame axis can reside at an angle of between 160 degrees and 200 degrees with a longitudinal axis of a vehicle chassis of the vehicle. Preferably the vehicle chassis axis is substantially parallel to the frame's axis. The fame's axis at an angle of 180 degrees with the longitudinal vehicle chassis axis. In the storage position the frame axis can reside at an angle with the longitudinal axis of the chassis of from 70 degrees to 120 degrees. Preferably the frame axis is perpendicular to the vehicle chassis axis. The frame first section travels along an arcuate path when said frame orients from said operative position to said storage position. The frame orients from the extended configuration to the retracted position during orienting from the operative to the storage position. In the storage position a portion of the vehicle suspension assembly traveled along the arcuate path resides behind and obstructed by a portion of the vehicle.

Naturally, further objects of the invention are disclosed throughout other areas of the specification, drawings, photographs, and claims.

V. DETAILED DESCRIPTION OF THE PREFERRED EMBODIMENTS

FIGS. 1, 2, 3, 4 and 5 show a vehicle suspension assembly (20) which embodies features of the present invention. The assembly (20) can include a first trailing arm (22*a*). The assembly can include a second a second trailing arm (22*b*). A cross support (52) interconnects the first trailing arm to the second trailing arm at an end portion of each trailing arm. Further the assembly includes first axle carrier assembly (24*a*), coupled to the first trailing arm (22*a*) and proximate or at a first end portion (26*a*) of the first trailing arm (22*a*). The first axle carrier assembly (24*a*) carries a first wheel axle (28*a*). A first connector (30*a*), coupled to the first trailing arm (22*a*) and at the first end portion (26*a*), couples to a first wheel suspension (32*a*). The first axle carrier assembly (24*a*) coupled to the first trailing arm (22*a*) is distal a second end portion (27*a*) of the first trailing arm. A first vehicle mount (34*a*), coupled to the first trailing arm second end portion (27*a*), couples to a vehicle (36). The first trailing arm (22*a*) is pivotably coupled to the first vehicle mount (34*a*).

A second axle carrier assembly (24*b*), coupled to the second trailing arm (22*b*) and proximate or at a first end portion (26*b*) of the second trailing arm (22*b*), carries a second wheel axle (28*b*). A second connector (30*b*), coupled to the first end portion (26*b*) of the second trailing arm (22*b*), couples to a second wheel suspension (32*b*). The second axle carrier assembly (24*b*) coupled to the second trailing arm (22*b*) is distal a second end portion (27*b*) of the second trailing arm (22*b*). A second vehicle mount (34*b*), coupled to the second trailing arm second end portion (27*a*), couples to the vehicle (36). The second trailing arm (22*b*) is pivotably coupled to the second vehicle mount (34*b*).

The first trailing arm (22*a*) and second trailing arm (22*b*) each include an extended configuration and a retracted configuration. In the extended configuration the length of the first (22*a*) and second (22*b*) trailing arms is increased along each arm's longitudinal axis (38*a*, 38*b*) as compared to when the arms (22*a*, 22*b*) reside in the retracted configuration. Further in the extended configuration the distance, as measured along the longitudinal axis (38*a*) of the first arm (22*a*), is increased between the first axle carrier assembly (24*a*) and the first vehicle mount (34*a*) as compared to when the first trailing arm resides in the retracted configuration. Further in the extended configuration the distance, as measured along the longitudinal axis (38*b*) of the second trailing arm (22*b*), is increased between the second axle carrier assembly (24) and the second vehicle mount (34*b*) as compared to when the second trailing arm (22*b*) resides in the retracted configuration.

The first (22*a*) and second trailing arm (22*b*) can form all or part of a vehicle suspension trailing arm (22*a*, 22*b*) or frame (22*a*, 22*b*) each having first (22*a*) and second (22*b*) trailing arms. The first (24*a*) and second (24*b*) axle carrier assemblies can form a trailing axel carrier assembly (24*a*, 24*b*). The first (34*a*) and second (34*b*) vehicle mounts can form a vehicle suspension trailing arm mount (34*a*, 34*b*) or frame mount (34*a*, 34*b*). The first (28*a*) and second (28*b*) wheel axle can form all or part of a trailing axle (28*a*, 28*b*, 28*c*) of the vehicle suspension assembly.

The first (22*a*) and second (22*b*) trailing arms of the vehicle suspension frame (22*a*, 22*b*) or vehicle suspension trailing arm (22*a*, 22*b*) are spaced apart a distance X (40). The distance can be measured along a line having a length which extends crosswise between the longitudinal axis (38*a*) of the first trailing arm (22*a*) and the longitudinal axis (38*b*) of the second trailing arm (22*b*). The crosswise length extends along a line perpendicular to and between the longitudinal axis of the first trailing arm and the second trailing arm. The term crosswise herein is broad enough to include traverse and vice versa. The orientation of the spaced first and second trailing arms provides for a longitudinal axis (42) of the spaced first (22a) and second (22b) trailing arms, the vehicle suspension trailing arm (22a, 22b), and the vehicle suspension frame (22a, 22b). The axis resides in an expanse between the first (22a) and second (22b) trailing arms. The axis (42) extends parallel to the first trailing arm axis (38a) and the second trailing arm axis (38b). The distance X extends along a line from an internal surface of the first trailing arm (22a). The internal surface faces and delimits the expanse. It extends to an internal surface of the second trailing arm (22b). The internal surface of the second trailing arm (22b) faces and delimits the expanse. The external surfaces can be parallel.

The vehicle suspension trailing arm (22a, 22b) or frame (22a, 22b) include an extended configuration and a retracted configuration. In the extended configuration the length of the vehicle suspension trailing arm (22a, 22b) or frame (22a, 22b) is increased along the vehicle suspension frame or vehicle suspension trailing arm's longitudinal axis (42) as compared to when the arm (22a, 22b) or frame (22a, 22b) reside in the retracted configuration. Further, in the extended configuration the distance, as measured along the longitudinal axis (42) of the arm (22a, 22b) or frame (22a, 22b), is increased between the axle carrier assembly (24a, 24b) and the vehicle mount (34a, 34b) as compared to when the trailing arm (22a, 22b) or frame (22a, 22b) reside in the retracted configuration.

Providing a vehicle suspension assembly (20) with trailing arms which each retract and extend makes available many advantages. A vehicle suspension assembly in the operative position, see FIG. 4, has first (34a) and second (34b) vehicle mounts connected to the vehicle (36), wheels (44) down on the ground and the arms' axis (38a, 38b) or frames axis (42) or vehicles suspensions arm axis (42) parallel to a longitudinal axis (46) of the vehicle chassis extending from the front of the chassis to the rear of the chassis. The arms (22a, 22b) or frame (22a, 22b) or vehicle suspension trailing arm (22a, 22b) in the extended configuration distributes weight over a greater longitudinal length measured along a longitudinal axis of the vehicle and suspension assembly measured from the front axle of the vehicle (36) to the trailing axle (28a, 28b, 28c) as compared to when in the retracted configuration. The greater distribution cuts back on road damage. The arms' axis (38a, 38b) or frames axis (42) or vehicle suspension arm's axis (42) could be at an angle from about 160 degrees to about 200 degrees with the vehicle chassis axis (46) when the vehicle suspension assembly resides in the operative position.

Figure 1:
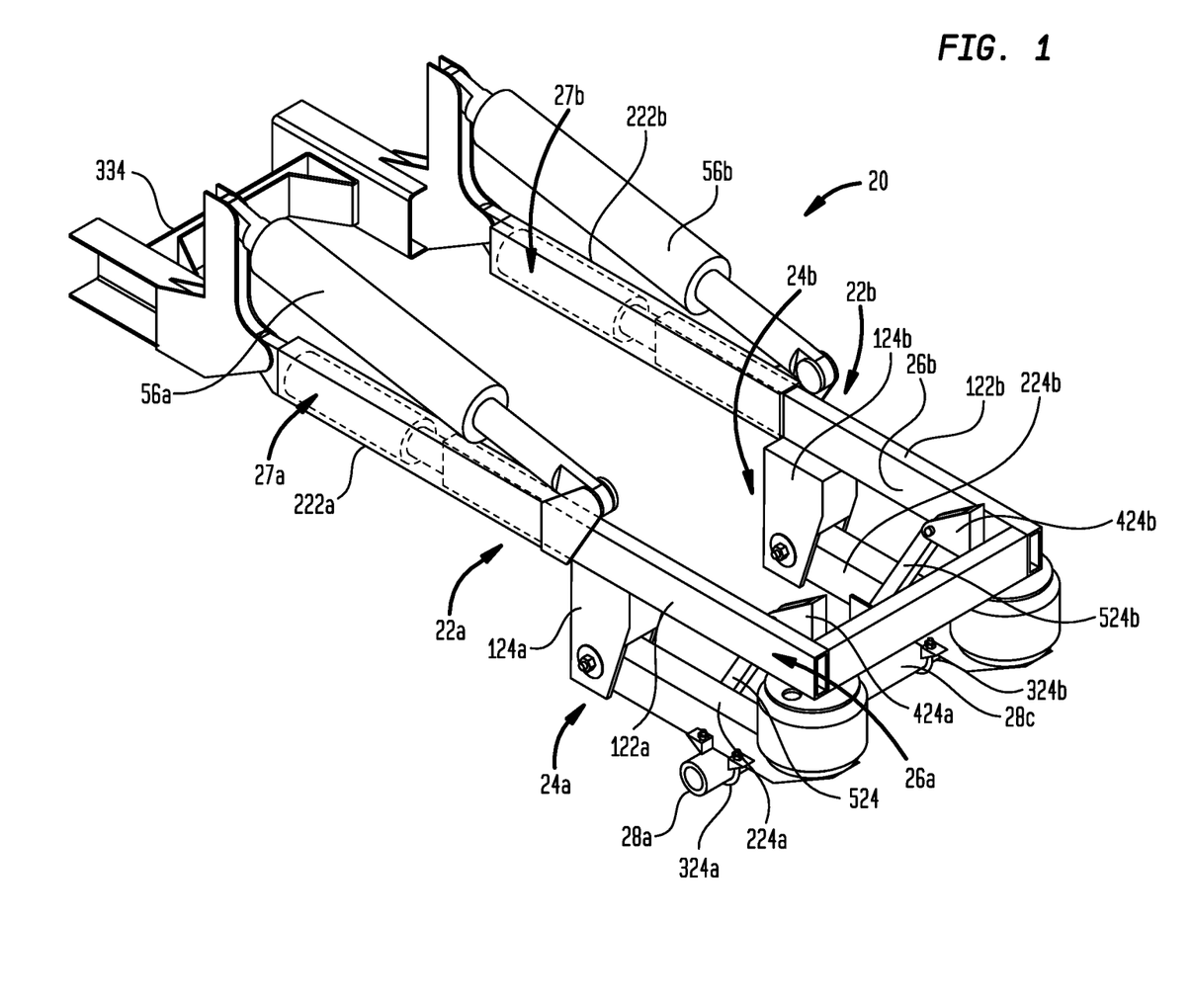
FIG. 1 shows an upper isometric view of a vehicle suspension assembly in a horizontal position and retracted configuration.
Figure 2:
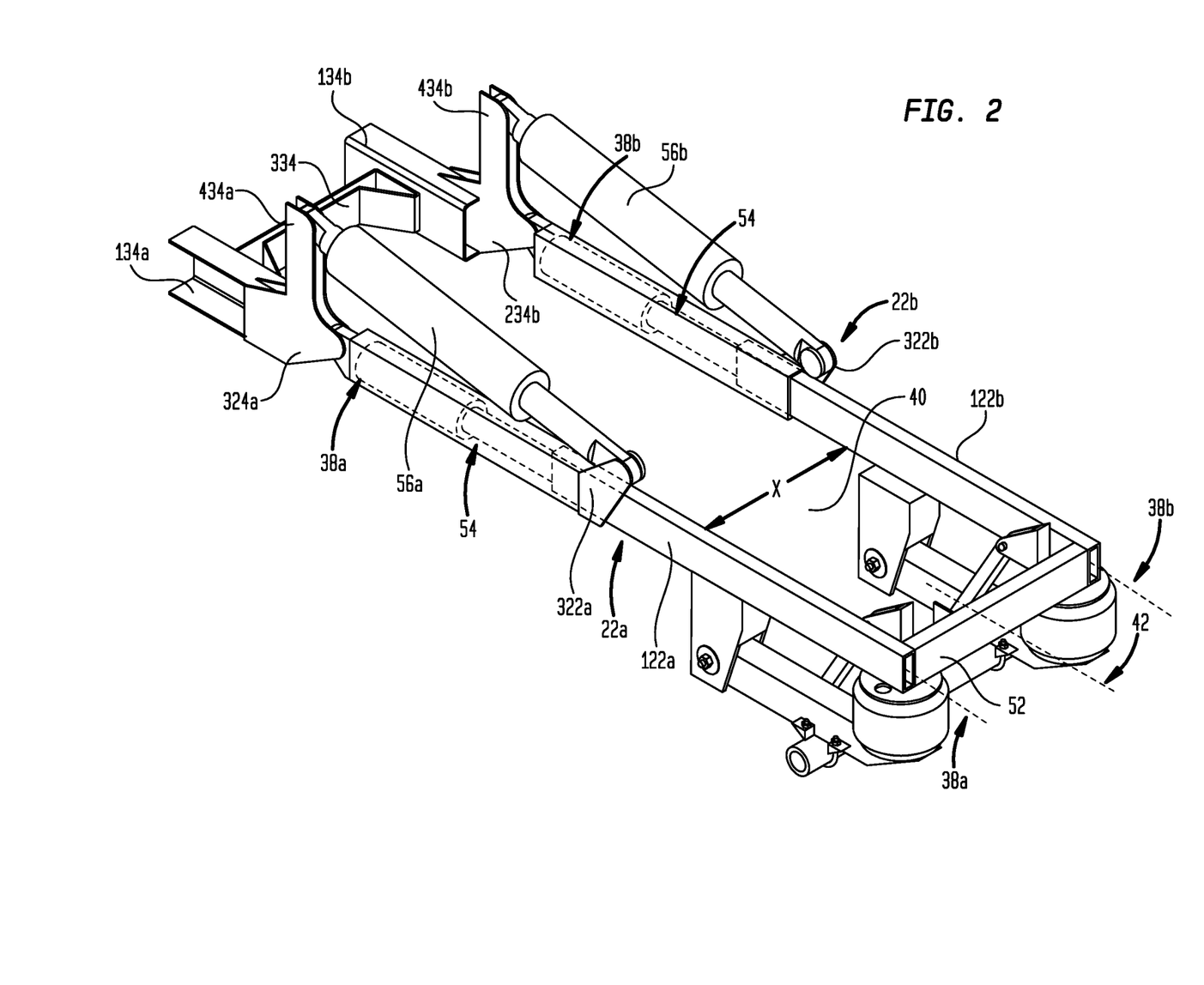
FIG. 2 shows the upper view of the vehicle suspension assembly of FIG. 1 in the horizontal position and extended configuration.
Figure 3:
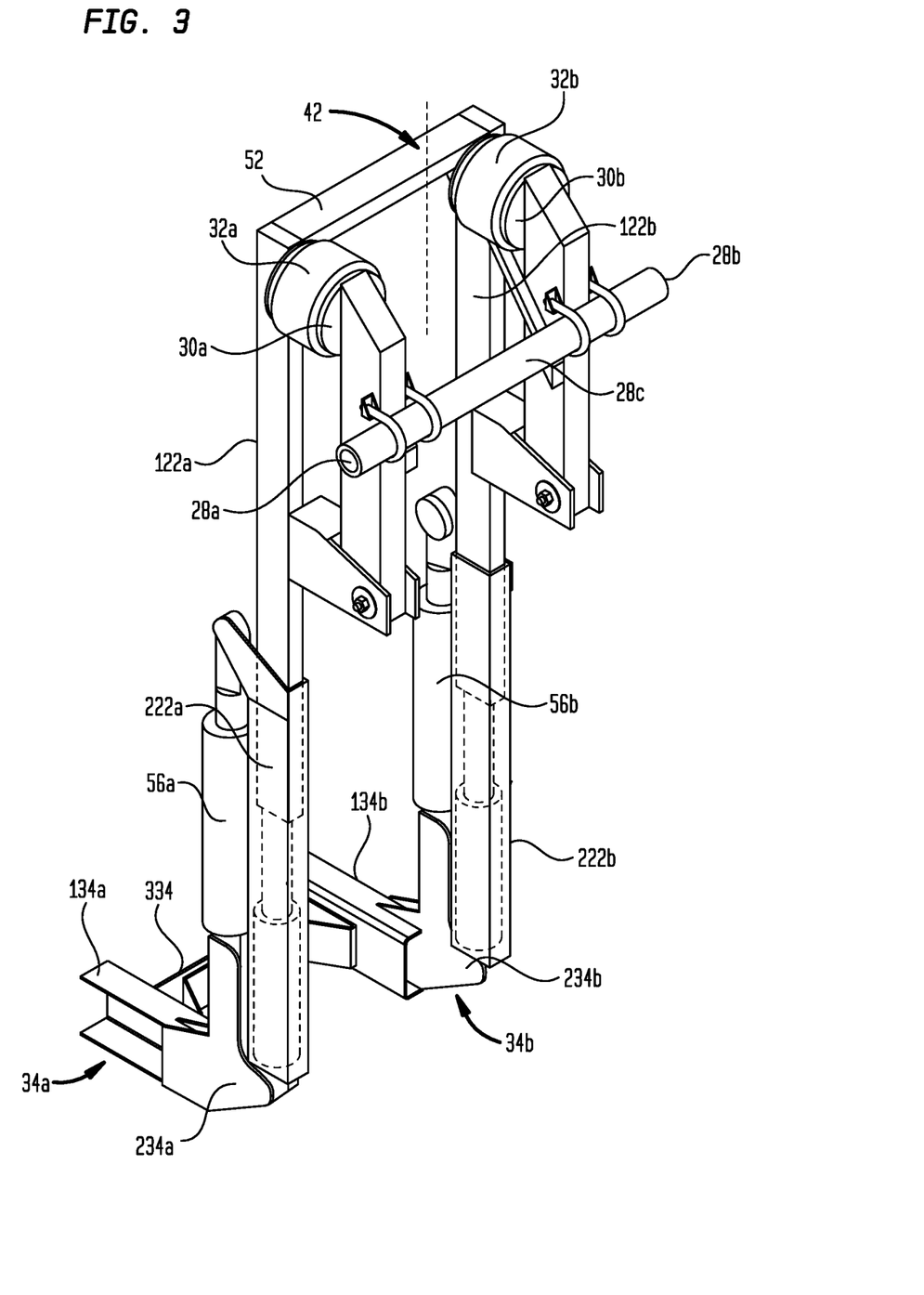
FIG. 3 shows a side underside view of the vehicle suspension assembly of FIG. 1 in an upright position and extended configuration.
Figure 4:
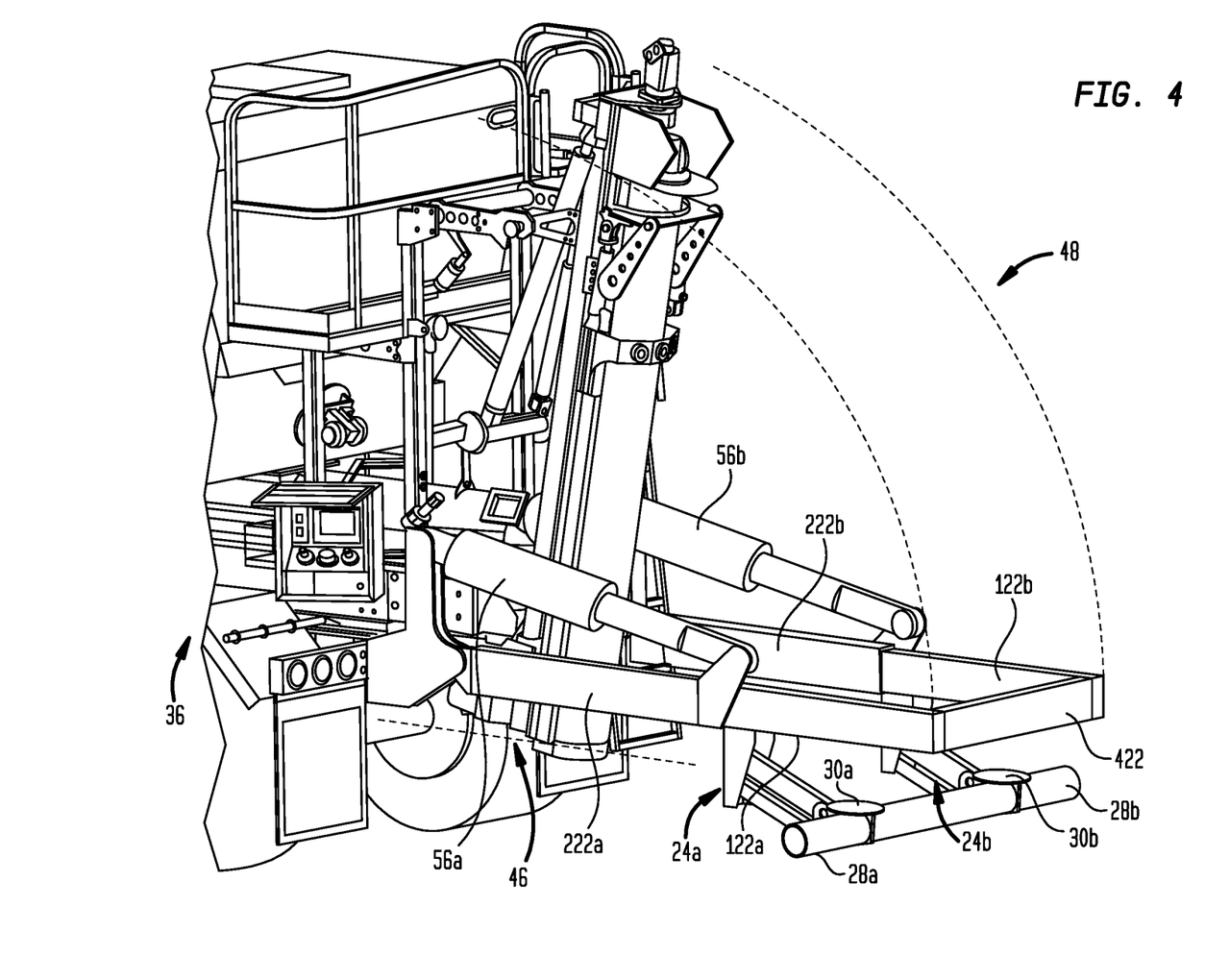
FIG. 4 shows a side upper view of the vehicle suspension assembly of FIG. 1 in a laid down position and contracted configuration wherein a vehicle mount of the assembly connects a frame of the vehicle suspension assembly to a rear of a vehicle.
Figure 5:
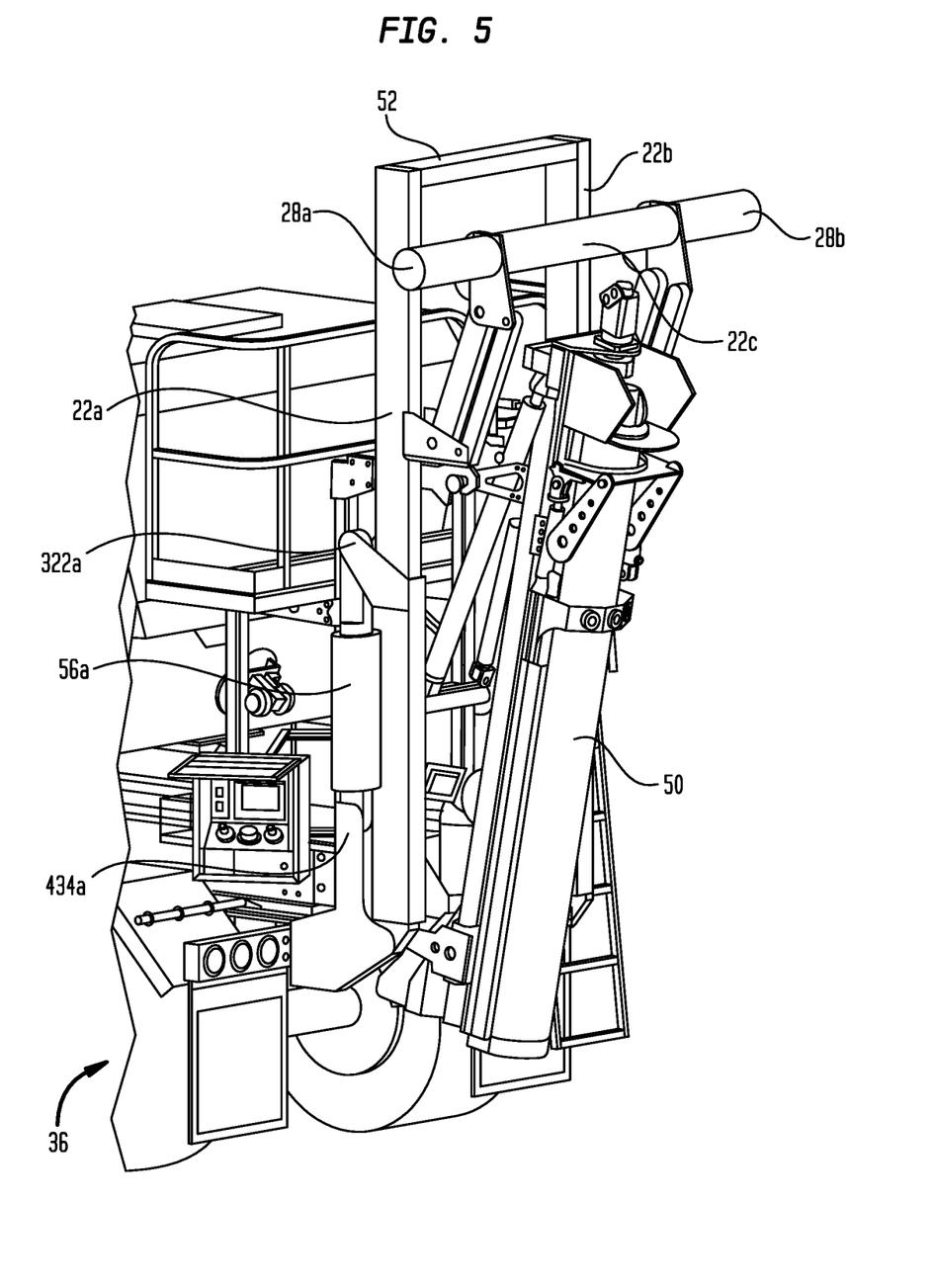
FIG. 5 shows a side underside view of the vehicle suspension assembly of FIG. 1 in an upright position and extended configuration wherein the vehicle mount of the assembly connects the frame of the assembly to the rear of the vehicle.
Figure 6:
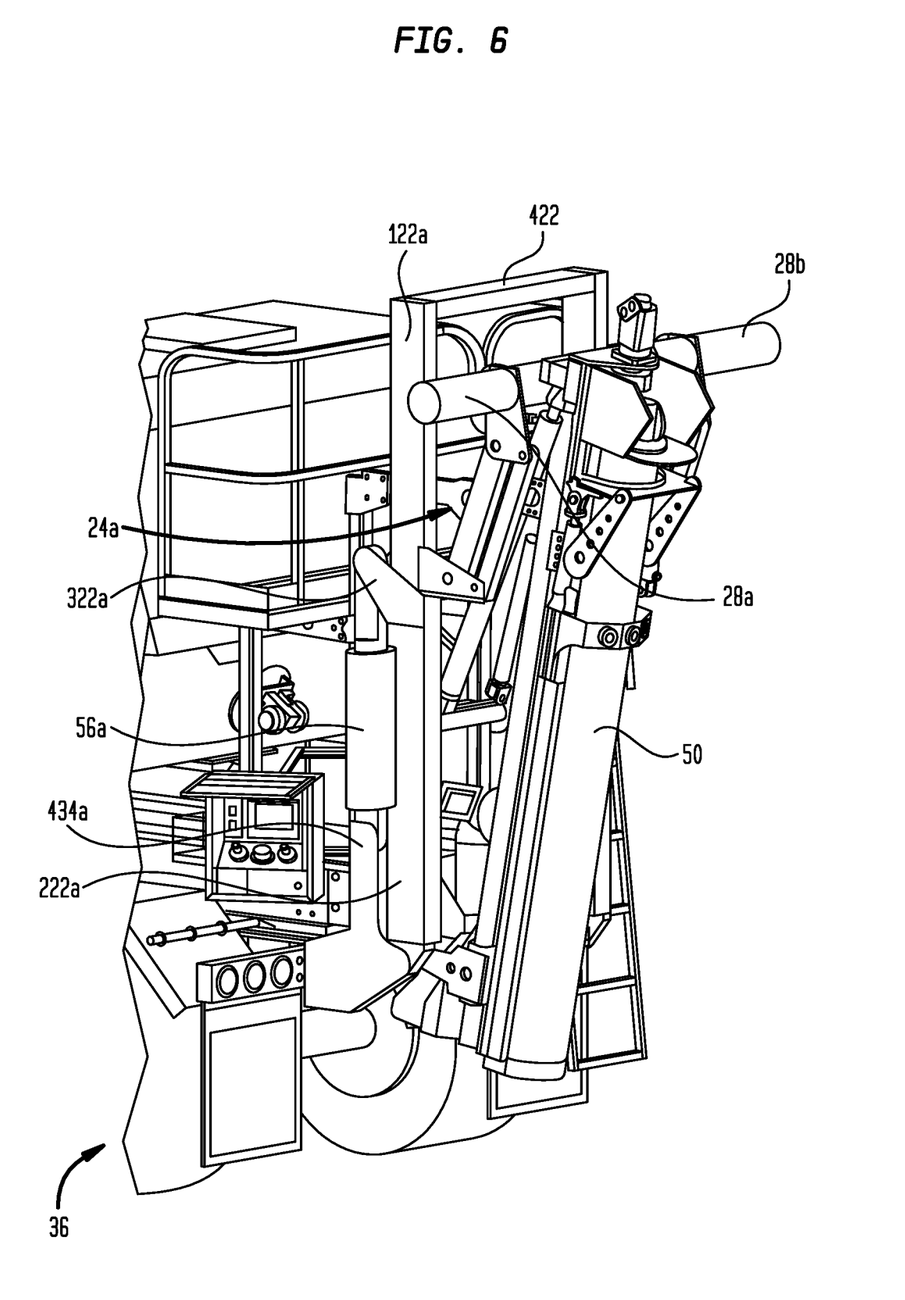
FIG. 6 shows a side underside view of the vehicle suspension assembly of FIG. 1 in an upright and storage position and contracted configuration wherein the vehicle mount of the assembly connects the frame of the assembly to the rear of the vehicle.
Figure 7:
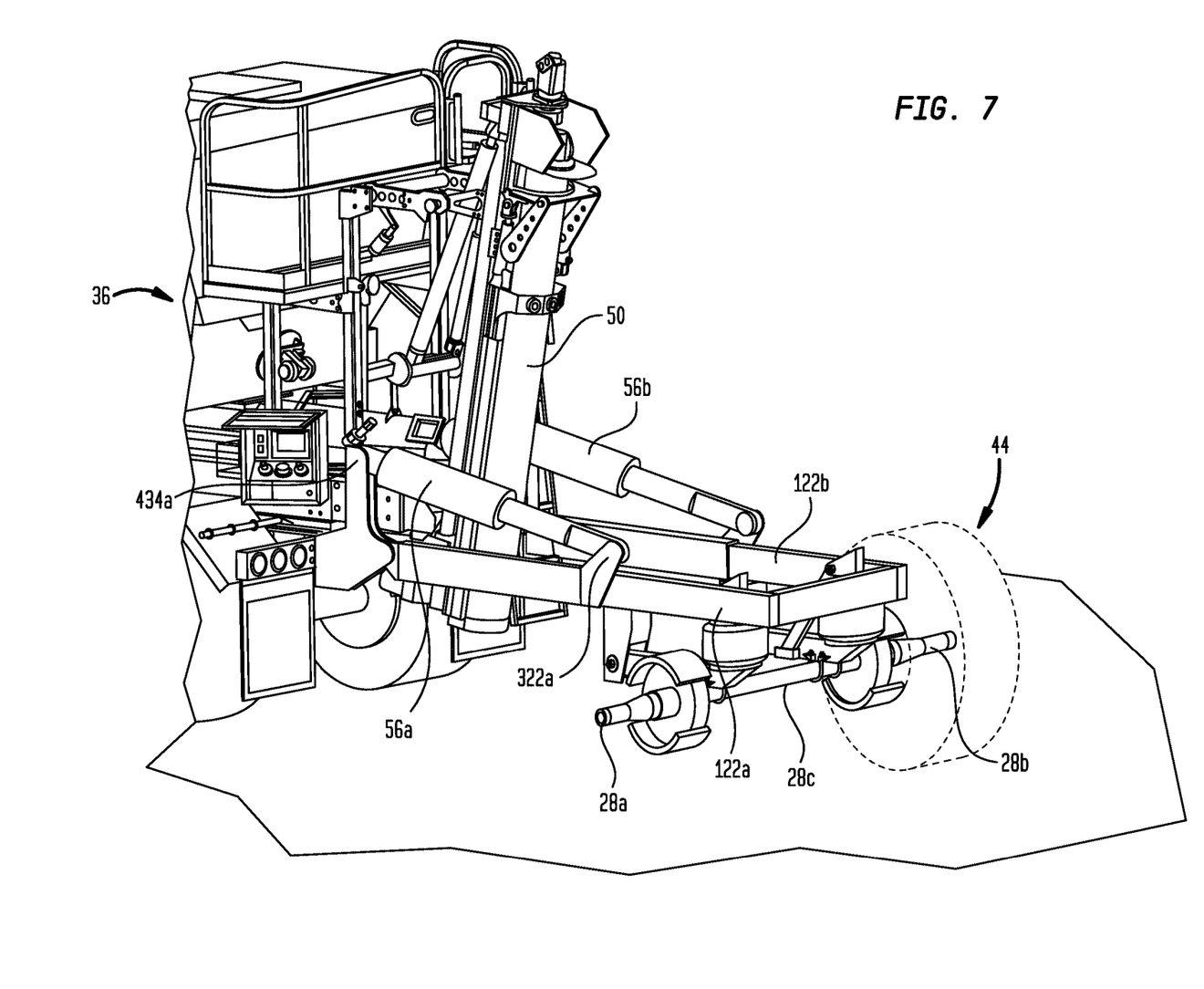
FIG. 7 shows a side upper view of the vehicle suspension assembly of FIG. 1 in a laid down position and contracted configuration wherein the vehicle mount of the assembly connects the frame of the assembly to the rear of the vehicle; further if the axle of the suspension assembly had another tire thereon the assembly would be in an operative position.

The retraction feature also provides for greater variability in orienting the vehicle suspension assembly from the operative position, see FIG. 7, to a stored position, see FIG. 6. In the stored position, the vehicle suspension assembly (20) remains connected to the vehicle (36) and resides in an upright position. The axis (38a, 38b) of the first (22a) and second (22b) trailing arms or frame axis (42) or vehicle suspension arm's axis (42) reside perpendicular to the longitudinal chassis axis (46). These axis (38a, 38b, 42) could be at an angle with the chassis axis (46) of from about 70 degrees to about 120 degrees. The vehicle suspension first (22a) and second (22b) arms and their first (26a, 26b) and second end portions (27a, 27b) move along an arcuate path (48) from the operative position to the stored position.

The arc angle of the arcuate path is preferably 90 degrees but could vary from 70 to 120 degrees.

During positioning between the operative and stored positions, a portion of the vehicle structure (50) on the rear of the truck (36) may reside in the arcuate pathway traveled by a portion of the vehicle suspension assembly such as the trailing axle (28a, 28b, 28c) or a cross support (52) interconnecting first end portions (27a, 27b) of the first (22a) and second (22b) trailing arms if the vehicle suspension assembly resides with the arms (22a, 22b) in the retracted configuration. For instance, the present vehicle assembly by having first (22a) and second (22b) arms oriented in the retracted configuration places a component (50) on the rear of the truck (36) in the arcuate path (48) of the vehicle suspension assembly when positioning the assembly from the operative position to the stored position. Accordingly, an operator to orient the vehicle suspension assembly from the operative position to the stored position places the first (22a) and second (22b) trailing arms in the extended configuration before the trailing axle (28a, 28b, 28c) or cross support (52) travel along the accurate path (48) and contact the truck component (50). Moving the trailing arms (22a, 22b) to the extended configuration places the trailing axle (28a, 28b, 28c) or cross support (52) on a pathway which does not intersect with the component (50). Thus, the vehicle suspension assembly (20) can travel to the upright position of the storage position. Once in the upright position the operator can orient the first (22a) and second (22b) trailing arms into the retracted configuration placing the trailing axle (28a, 28b, 28c) and cross support behind the truck component (50). In this case the truck component (50) is an adjustable cement dispensing mechanism which can be called a trough. The dispensing mechanism (50) directs cement from the truck to a place of use remote from the truck trailer such as a wheel barrel. Of course, if the trailing arms (22a, 22b) are in the extended configuration and the vehicle suspension assembly is in the operative position, an operator can orient the assembly from the operative position to the upright orientation of the storage position with the arms (22a, 22b) in the extended configuration. Once upright, the operator can, while the assembly resides in the upright position, orient the arms (22a, 22b) into the retracted configuration placing the trailing axle (28a, 28b, 28c) and cross support (52) behind the trough (50).

The vehicle suspension assembly has advantages over an assembly in which the arms have a fixed length equal to the length of arms in the extended configuration. The fixed arms will ensure the trailing axle and cross support clear the trough when moved to the upright position. The fixed length, however, creates instability. The fixed arms give the assembly a height when in the storage position measured from the bottom of the chassis of the trailer to the trailer arms first ends greater than if the assembly has arms in the contracted state. The increased height caused by the fixed arms creates instability for the vehicle.

Now referring to the trailing arms in more detail, the first trailing arm (22a) and second trailing arm (22b) each include a first trailing section (122a, 122b) retractably engaged to a second trailing section (222a, 222b). Each trailing arm (22a, 22b) includes a drive (54) to move its trailing arm first section (122a, 122b) relative to its second trailing arm second section (222a, 222b) along the trailing arms' longitudinal axis (38a, 38b). During orienting the arms from a retracted configuration to an extended configuration, the drives (54) move the first end portions (26a, 26b) of the trailing arms away from the second end portions (27a, 27b) of the trailing arms along the trailing arms' longitudinal axis (38a, 38b). During movement, each arm first section (122a, 122b) slides along each trailing arm's second section (222a, 222b). The area of sliding can include the second section disposed within a channel of the first section or vice versa. The drive (54) can be disposed in the groove of the first section and/or a groove of the second section. The drive (54) can include a hydraulic cylinder, pneumatic cylinder, screw and track, gear and track, rack and pinion, and/or other linear actuator. A portion of the drives (54) can be connected to each of the first section (122a, 122b) and second sections (222a, 222b). The drive can be powered by a prime mover remote or onboard the vehicle suspension assembly.

Now referring to the first (24a) and second (24b) axle carrier assemblies in more detail, each assembly can include the following. A support (124a, 124b)) fixedly connected to a respective first end (26a, 27a) portions of the respective trailing arms. A first arm (224a, 224b) pivotably coupled to the respective support (124a, 124b). Respective wheel suspension connectors (30a, 30b) reside at the respective first arms (224a, 224b). A respective axle receiver (324a, 324b) carried by the respective first arm (224a, 224b). A respective second support (424a, 424b) fixedly coupled to the respective first end portion (26a, 26b) of the respective trailing arm (22a, 22b). A respective second arm (524a, 524b) pivotably coupled to the second support (424a, 424b) and respective first arm (224a, 224b).

The suspension connectors (30a, 30b) can each provide support for wheel suspensions (32a, 32b). The wheel suspensions (32a, 32b) can connect to their respective connectors (30a, 30b). The respective suspensions (32a, 32b) can extend away and from their respective connectors and connect with the cross support (52). Each suspension connector (30a, 30b) can interconnect its respective first arm (224a, 224b) of its axle carrier assembly to the cross support (52). The wheel suspensions (32a, 32b) can comprise a resilient elastomer body, an air bag, and/or shock absorber.

In more detail, the first wheel axle (28a) extends crosswise relative to the first trailing arm axis (38a) and away from the first (22a) and second (22b) trailing arms and outside the expanse between the first (38a) and second (38b) trailing axis. The first wheel axle (28a) extends perpendicular to the first trailing arm axis (38a). With the vehicle suspension assembly (20) in a wheel carrying configuration, a first wheel (44) (not shown) couples to the first wheel axle (28a). The first wheel (44) resides about the first axle (28a). The first wheel axle (28a) can form a spindle.

The second wheel axle (28b) extends crosswise relative to the second trailing arm axis (38b) and away from the first (22a) and second (22b) trailing arms and outside the expanse between the first (38a) and second (38b) trailing axis. The second wheel axle (28b) extends perpendicular to the second trailing arm axis (38b). With the vehicle suspension assembly (20) in a wheel carrying configuration a second wheel (44) couples to the second wheel axle (28b). The second wheel (44) resides about the second axle (28b). The second wheel axle can form a spindle.

A connecting axle (28c) can interconnect the first wheel axle (28a) to the second wheel axle (28b). The connecting axle (28c) can be fixedly coupled to the first (28a) and second (28b) wheel axles. Alternatively, the connecting wheel axle (28c) can be rotatably coupled to the first (28a) wheel axle and second (28b) wheel axle. The connecting axle (28c) in this case would be fixedly coupled to the first (22a) and second (22b) trailing arms. The connecting axle forms part of the trailing axle (28a, 28b, 28c). The first axle (28a) is at first end portion of the trailing axle and the second axle (28b) is at a second end portion of the railing axle.

The first vehicle mount (34a) and second (34b) vehicle mount each can include the following structure, a rigid connector (134a, 134b), a pivot (234a, 234b) interconnecting the rigid connector (134a, 134b) to a respective trailing arm (22a, 22b). The rigid connector interconnects the pivot (234a, 234b) to the vehicle (36). A cross support (334) interconnects the rigid connectors (134a, 134b) and the first (22a) and second (22b) trailing arms.

A lift (56a, 56b) connects the first (22a) and second (22b) trailing arms to the pivots (234a, 234b) of the trailing arm mounts. The lift comprises a first drive (56a) and a second drive (56b). The first drive (56a) interconnects the first trailing arm (22a) to the pivot (234a) of the first trailing mount (34a). The first drive itself is pivotally connected the first trailing arm mount (34a) at pivot (434a). The drive (56a) also pivotally connects to the first trailing arm second section (222a) at pivot (322a). The lift also comprises a second drive (56b) which interconnects the second trailing arm (22b) to the pivot (234b) of the second trailing arm mount. The second drive itself is pivotally connected the second trailing arm mount (34b) at pivot (434b). The second drive (56b) also pivotally connects to the second trailing arm second section (222b) at pivot (322b). The first and second drives can comprise hydraulic cylinder, a cable, or other adjustable length member.

As can be easily understood from the foregoing, the basic concepts of the present invention may be embodied in a variety of ways. The invention involves numerous and varied embodiments of a vehicle suspension assembly and methods for making and using such vehicle suspension assembly.

As such, the particular embodiments or elements of the invention disclosed by the description or shown in the figures or tables accompanying this application are not intended to be limiting, but rather illustrative of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "trailing arm" should be understood to encompass disclosure of the act of "trailing"—whether explicitly discussed or not—and, conversely, were there effectively disclosure of the act of "moving the trailing arm", such a disclosure should be understood to encompass disclosure of a "moved trailing arm" and even a "means for moving." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in Merriam-Webster's Collegiate Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the vehicle suspension assemblies herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application describes certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A vehicle suspension assembly comprising:
    a frame having a first frame section slidably engaged to a second frame section;
    a trailing axle carrier assembly connected to the first frame section;
    a trailing axle coupled to said frame by said trailing axle carrier assembly;
    a pivot connected to said second frame section;
    a drive coupled to said first frame section and said second frame section;
    a lift coupled to said frame; and wherein
    said drive actuatable to orient said frame into an extended configuration from a retracted configuration, and orient said frame from said contracted configuration to said extended configuration; said frame in said extended configuration having an increased length along a longitudinal axis of the frame as compared to when the frame resides in the retracted configuration.

2. The vehicle suspension assembly of claim 1, wherein said frame comprises:
    a first trailing arm having a first trailing arm section slidably engaged to a second trailing arm section.

3. The vehicle suspension assembly of claim 2, wherein said frame comprises:
    a second trailing arm having a first trailing arm section slidably engaged to a second trailing arm section.

4. The vehicle suspension assembly of claim 2, wherein said first frame section comprises:
    said first trailing arm section of said first trailing arm.

5. The vehicle suspension assembly of claim 4, wherein said first frame section comprises:
    said first trailing arm section of said second trailing arm.

6. The vehicle suspension assembly of claim 5, wherein said second frame section comprises:
    said second trailing arm section of said first trailing arm.

7. The vehicle suspension assembly of claim 6, wherein said second frame section comprises:
    said second trailing arm section of said second trailing arm.

8. The vehicle suspension assembly of claim 2, wherein said first trailing arm comprises:
- a first end and a second end; and,
- wherein said trailing axle carrier assembly proximate said first trailing arm first end, distal said first trailing arm second end, and connected to said first trailing arm.

9. The vehicle suspension assembly of claim 8, wherein said second trailing arm comprises:
- a first end and a second end; and,
- wherein said trailing axle carrier assembly resides proximate said second trailing arm first end, distal said second trailing arm second end, and connected to said second trailing arm.

10. The vehicle suspension assembly of claim 8, wherein said first trailing arm first end resides at said first trailing arm first section, said first trailing arm second end resides at said first trailing arm second section.

11. The vehicle suspension assembly of claim 10, wherein said second trailing arm first end resides at said second trailing arm first section, said second trailing arm second end resides at said second trailing arm second section.

12. The vehicle suspension assembly of claim 11, further comprising:
- a cross support, said cross support interconnects the first trailing arm to the second trailing arm.

13. The vehicle suspension assembly of claim 12, wherein:
- said cross support interconnects the first trailing arm first section to said second trailing arm first section.

14. The vehicle suspension assembly of claim 13, wherein:
- said cross support resides at the first trailing arm first end and said second trailing arm first end.

15. The vehicle suspension assembly of claim 14, wherein said trailing axle comprises:
- a first wheel axle and a second wheel axle.

16. The vehicle suspension assembly of claim 15, wherein said trailing axle carrier assembly further comprises:
- a first axle carrier assembly connected to said first trailing arm at said first trailing arm first section, said first axle carrier assembly carrying said first wheel axle at said first trailing arm first section.

17. The vehicle suspension assembly of claim 16, wherein said first axle carrier assembly comprises:
- a first connector interconnecting said first wheel axle to said first trailing arm.

18. The vehicle suspension assembly of claim 17, wherein said first connector interconnects said first wheel axle to said first trailing arm first section.

19. The vehicle suspension assembly of claim 18 further comprising:
- a first vehicle suspension interconnecting said first connector to said first trailing arm first section.

20. The vehicle suspension assembly of claim 19, wherein said trailing axle carrier assembly further comprises:
- a second axle carrier assembly connected to said second trailing arm first section, said second axle carrier assembly carrying said second wheel axle at said second trailing arm first section.

\* \* \* \* \*

UNITED STATES PATENT AND TRADEMARK OFFICE
CERTIFICATE OF CORRECTION

| | | |
|---|---|---|
| PATENT NO. | : 11,827,072 B2 | |
| APPLICATION NO. | : 17/877368 | |
| DATED | : November 28, 2023 | |
| INVENTOR(S) | : Brent Anthony Holcombe | |

It is certified that error appears in the above-identified patent and that said Letters Patent is hereby corrected as shown below:

In the Claims

In Column 10, Line 42 (Claim 1, Line 14) "said contracted configuration" should read --said retracted configuration--.

Signed and Sealed this
Twenty-fifth Day of June, 2024

*Katherine Kelly Vidal*

Katherine Kelly Vidal
*Director of the United States Patent and Trademark Office*